(12) United States Patent
Takahashi (10) Patent No.: US 6,804,535 B2
(45) Date of Patent: *Oct. 12, 2004

(54) COMMUNICATION APPARATUS CAPABLE OF CONNECTING INFORMATION PROCESSING APPARATUS

(75) Inventor: Takumi Takahashi, Fuchu (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/325,962

(22) Filed: Jun. 4, 1999

(65) Prior Publication Data

US 2003/0036397 A1 Feb. 20, 2003

(30) Foreign Application Priority Data

Jun. 11, 1998 (JP) .......................................... 10-179749

(51) Int. Cl.⁷ .............................. H04B 1/38; H04M 1/00
(52) U.S. Cl. ........................ 455/557; 455/502; 455/466
(58) Field of Search ........................ 455/66, 560, 561, 455/74.1, 556, 557, 74, 434, 450–455, 502, 466; 370/280, 321, 347, 350

(56) References Cited

U.S. PATENT DOCUMENTS

| | | | | |
|---|---|---|---|---|
| 5,297,190 A | * | 3/1994 | Ito ............................. | 455/455 |
| 5,396,496 A | * | 3/1995 | Ito et al. ..................... | 370/314 |
| 5,907,585 A | * | 5/1999 | Suzuki et al. ................ | 375/324 |
| 6,041,046 A | * | 3/2000 | Scott et al. .................. | 370/319 |
| 6,088,590 A | * | 7/2000 | Anderson et al. ........... | 455/437 |
| 6,094,575 A | * | 7/2000 | Anderson et al. ........... | 455/422 |
| 6,154,456 A | * | 11/2000 | Rakib et al. ................. | 370/342 |
| 6,212,173 B1 | * | 4/2001 | Lindsay et al. ............. | 370/331 |
| 6,243,372 B1 | * | 6/2001 | Petch et al. ................. | 370/350 |

FOREIGN PATENT DOCUMENTS

WO    WO 94/05101    * 3/1994

\* cited by examiner

*Primary Examiner*—Charles Craver
(74) *Attorney, Agent, or Firm*—Morgan & Finnegan, LLP (57) ABSTRACT

Even when data are transmitted between communication apparatuses, the data time intervals can be synchronized between the transmitting and receiving sides.

Information that pertains to the interval of data transmitted from an information apparatus is appended to data, and that data is transmitted. A communication apparatus on the side of a communication partner that receives the data transmits data to an information apparatus on the basis of the received information that pertains to the interval of data. Variations of data intervals can be suppressed, and the data intervals can be synchronized between the transmitting and receiving sides.

16 Claims, 9 Drawing Sheets

COMMUNICATION APPARATUS CAPABLE OF CONNECTING INFORMATION PROCESSING APPARATUS

BACKGROUND OF THE INVENTION

1. Field of the Invention

The present invention relates to a communication apparatus capable of connecting an information processing apparatus.

2. Description of the Related Art

Conventionally, in order to make a radio data communication of data transmitted from an information apparatus via a radio apparatus, the information apparatus and radio apparatus are connected via a wired connection such as RS-232-C, or the like. The radio apparatus encapsulates incoming data from the information apparatus in a radio frame in the radio apparatus, and sends that frame to a partner radio apparatus. Upon receiving the frame, the partner radio apparatus strips off the radio frame wrapping, and sends the data to an information apparatus connected to itself.

In such case, the wired section between the information apparatus and radio apparatus, and the wireless section between the radio apparatuses often use different data transfer rates and data transmission schemes. For example, when the RS-232-C is used in the wired section, the data transfer rate approximately ranges from 9.6 kbps to 115.2 kbps. On the other hand, in the wireless section, although various data transfer rates are available depending on the frequencies and modulation schemes used, when a specific small power radio wave is used, the data transfer rate approximately ranges from 1,200 bps to 4,800 bps. On the other hand, when a spread spectrum communication system such as a radio LAN or the like is used, the data transfer rate approximately ranges from 1 Mbps to 2 Mbps.

Also, as the data transmission scheme the RS-232-C as the wired connection uses start-stop transmission for sequentially transmitting generated transmission data in units of bytes, while the wireless connection uses a scheme of transmitting a packet obtained by packetizing several bytes so as to effectively use a radio wave.

When the wired and wireless sections have different data transfer rates and data transmission schemes, the interval between data transmitted from the information apparatus to the radio apparatus on the transmitting side has changed via the wired and wireless sections on the transmitting side, and the interval of data transmitted to the receiving information apparatus becomes different from that upon transmission in the transmitting information apparatus.

Figure 1:
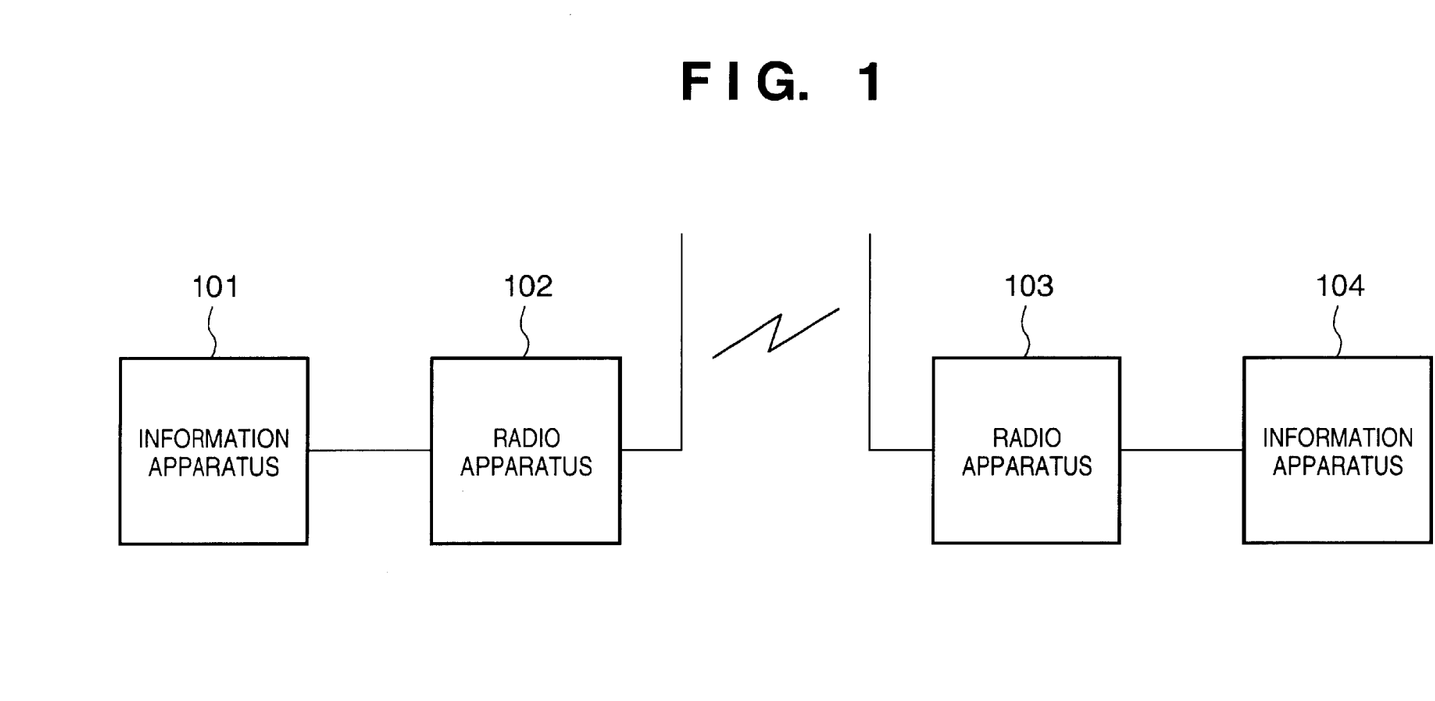
FIG. 1 is a schematic block diagram showing a radio data communication system according to an embodiment of the present invention.
Figure 9:
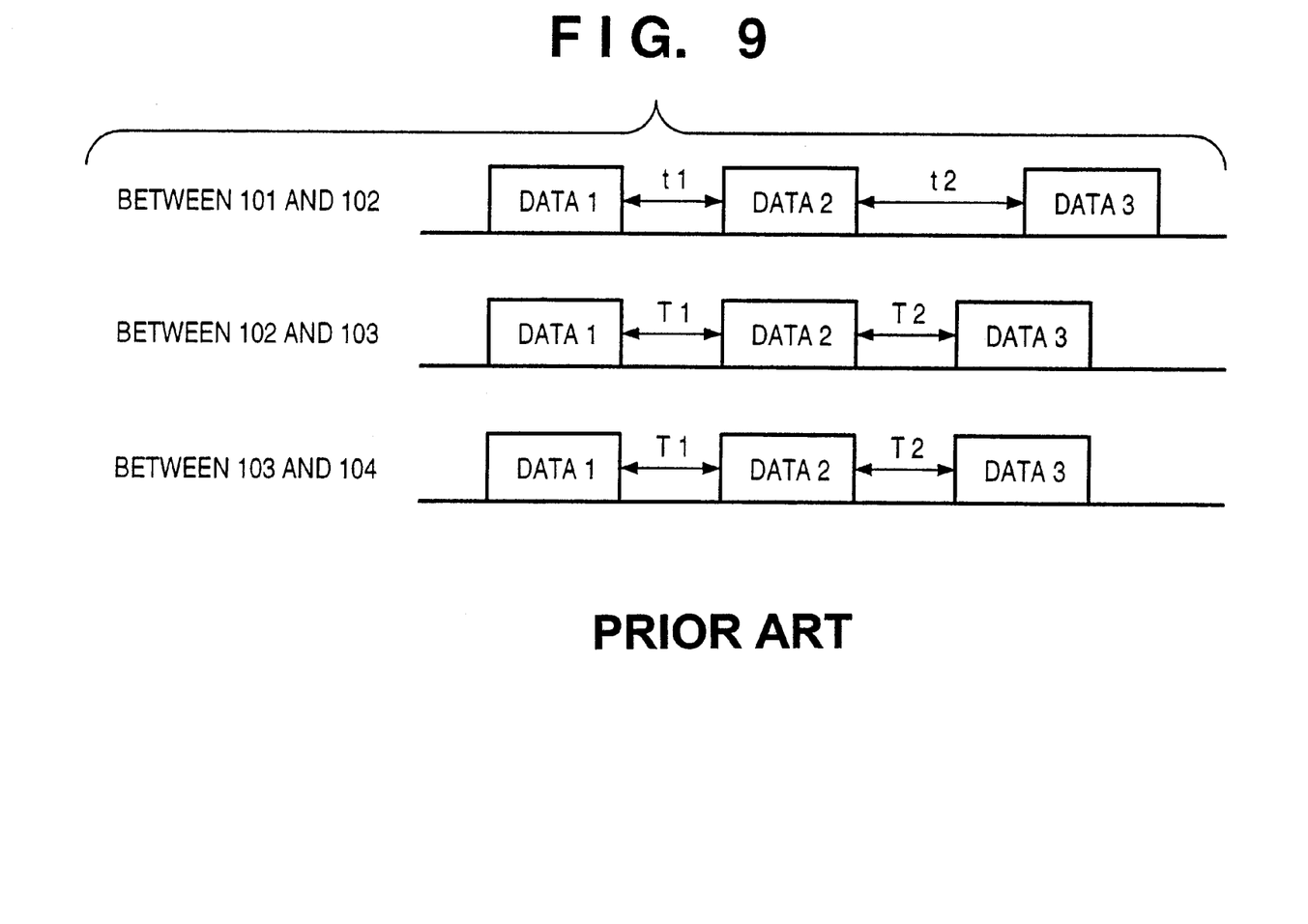
FIG. 9 is a timing chart showing the timings of transmission data in a conventional radio data communication system.

FIG. 1 is a schematic block diagram showing such radio data communication system. FIG. 9 is a timing chart showing the timings of transmission data in the conventional radio data communication system. The aforementioned prior art will be explained below with reference to FIGS. 1 and 9.

Referring to FIG. 1, an information apparatus 101 and radio apparatus 102 are transmitting apparatuses, and are connected via a wired connection. On the other hand, a radio apparatus 103 and information apparatus 104 are receiving apparatuses, and are similarly connected via a wired connection. The radio apparatuses 102 and 103 are connected via a wireless connection.

FIG. 9 shows changes in interval between adjacent data 1 to 3 transmitted by the information apparatus 101 until they are received by the information apparatus 104. Between the information apparatus 101 and radio apparatus 102, the interval between data 1 and 2 is represented by t1, and that between data 2 and 3 by t2. That is, t1 and t2 in this case indicate the data transmission intervals of the information apparatus 101.

When data 1 to 3 are input to the radio apparatus 102, they are encapsulated in radio frames. In this case, data are segmented or combined depending on the data length available in the radio frame. Assume that one data is transmitted using one radio frame.

In the wireless section between the radio apparatuses 102 and 103, data 1 to 3 are transmitted so that the interval between data 1 and 2 changes to T1 and that between data 2 and 3 to T2 as a result of the data processing of the radio apparatus 102. The transmitted data are received by the radio apparatus 103. T1 and T2 are determined by the processing time required for a radio frame encapsulation process and radio frame transmission in the radio apparatus 102, but are roughly constant intervals.

Data 1 to 3 received by the radio apparatus 103 are stripped off the radio frame wrappings, and are transmitted to the information apparatus 104. In this case, the transmission intervals between adjacent data are the same as those of data received by the radio apparatus 103, i.e., the interval between data 1 and 2 is T1, and that between data 2 and 3 is T2.

As described above, in the prior art, the transmission interval of data transmitted by the transmitting information apparatus 101 does not match the reception interval of data received by the receiving information apparatus 104. The data interval is determined by the data transfer rate and processing speed in the wireless section between the radio apparatuses 102 and 103, and the transmission interval of data intended by the transmitting information apparatus 101 changes by the time the data are received by the information apparatus 104.

When the data reception interval has changed between the transmitting and receiving information apparatuses 101 and 104, if moving images or quasi-still images displayed at given intervals on the information apparatus 101 are simultaneously transferred to and displayed on the information apparatus 104, changes in frame in the information apparatus 101 cannot be synchronized with those in the information apparatus 104, resulting in unnatural image display.

SUMMARY OF THE INVENTION

It is an object of the present invention to provide a radio data communication system and scheme, which can suppress variations of such data time intervals, and can synchronize the data time intervals between the transmitting and receiving sides even when data are transmitted using a wireless section.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

FIG. 1 is a schematic block diagram showing a radio data communication system according to an embodiment of the present invention.

Referring to FIG. 1, information apparatuses 101 and 104 are information processing apparatuses such as personal computers or the like, and have a connection function to I/O means such as a keyboard for inputting data, a camera for inputting an image, and the like, or are hybrid apparatuses which incorporate these I/O means. The information apparatus 101 processes general information, and is an apparatus serving as an information source such as a versatile personal computer, game machine, facsimile apparatus, video camera, digital camera, or the like in this embodiment.

Radio apparatuses 102 and 103 have interfaces with the information apparatuses 101 and 104 and a radio communication function. In this embodiment, the radio apparatus 102 is located on the transmitting side of radio data, and is connected to the information apparatus 101 via a wired connection. The radio apparatus 103 is located on the receiving side of radio data transmitted from the radio apparatus 102, and is connected to the information apparatus 104 via a wired connection. Note that the radio communication system between the radio apparatuses 102 and 103 is not particularly specified in this embodiment.

In terms of radio communication management, the radio communication system of this embodiment is built by a master station having a master station function of managing and controlling radio communications of one or more subsidiary stations accommodated in this radio communication system, and one or more subsidiary stations which are connected to the master station via radio channels and undergo radio communication control by the master station. In this system, the master station and subsidiary station or two subsidiary stations make radio communications using one or more predetermined frequencies and radio frames.

In the radio communication system of this embodiment, the information apparatus 101 and radio apparatus 102, and the information apparatus 104 and radio apparatus 103 are connected to each other via external interfaces to respectively construct radio terminals. The radio apparatus 102 or 103 is classified to a one having a master station function or a subsidiary station function depending on the roles required of them: radio control, assignment of radio resources (frequencies and the like), and so on.

Figure 2:
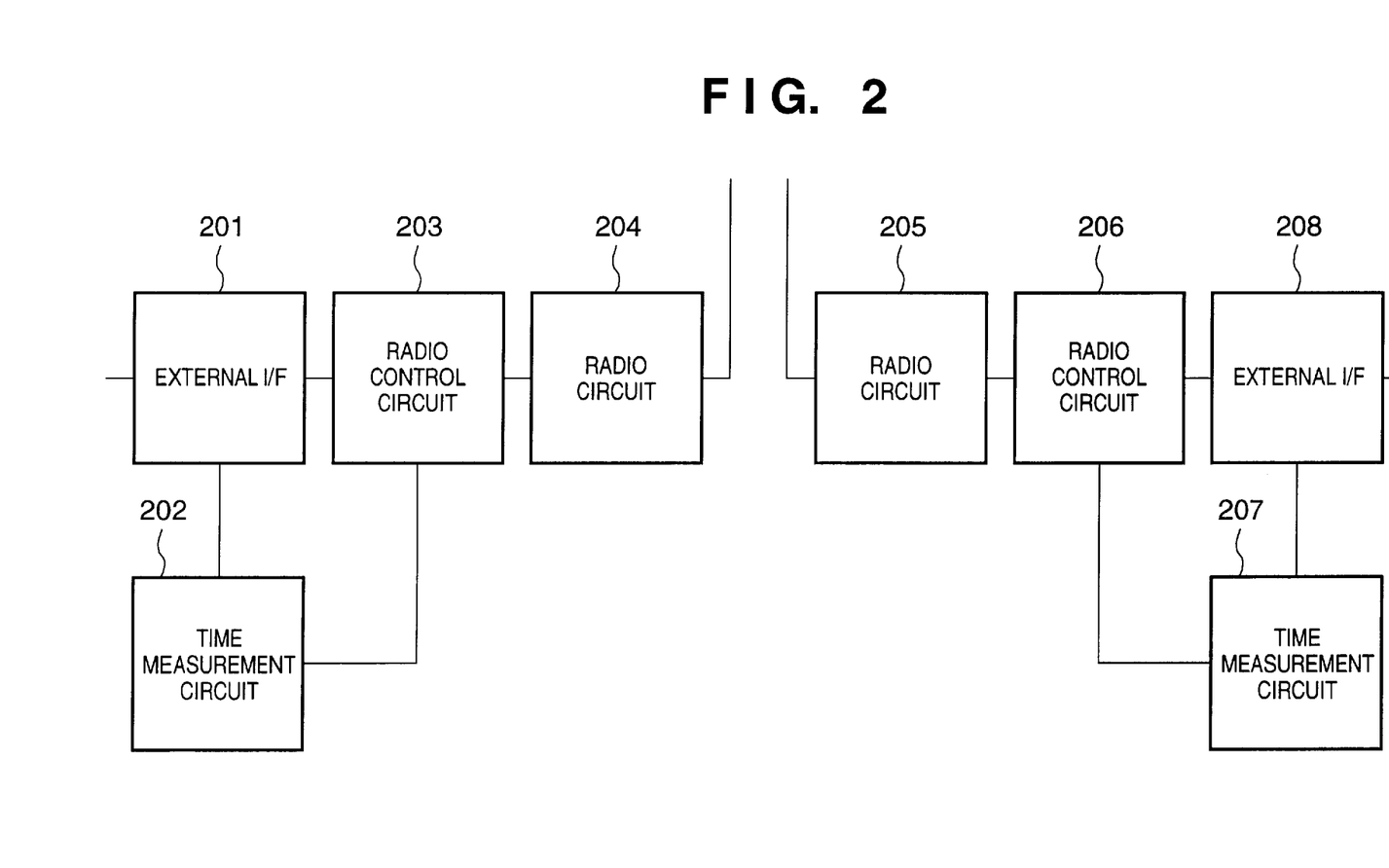
FIG. 2 is a block diagram showing the internal arrangement of a radio apparatus provided to the radio data communication system shown in FIG. 1.

FIG. 2 is a block diagram showing the principal internal arrangement of the radio apparatuses 102 and 103 shown in FIG. 1 according to this embodiment.

Referring to FIG. 2, external interfaces 201 and 208 are used for making communications by the radio apparatuses 102 and 103 using external interfaces equipped in the information apparatuses 101 and 104, for example, communication interfaces such as RS-232-C, Centronics, LAN, and the like, or the internal bus, ISA bus, PCI bus, PCMCIA interface, and the like of a PC or workstation.

Time measurement circuits 202 and 207 measure the time intervals of data transmitted/received by the external interfaces 201 and 208. Each of the time measurement circuits 202 and 207 receives triggers upon start and end of reception of data by the external interface 201 or 208 from the information apparatus 101 or 104, measures the time interval between the reception end and start triggers, and informs a radio control circuit 203 or 206 of the measured time. Also, each time measurement circuit measures the time interval of data transmitted to the information apparatus after they are received via a radio channel.

The radio control circuits 203 and 206 control radio processing in the radio apparatuses. Each of the radio control circuits 203 and 206 has a function of switching the transmission/reception function of a radio circuit 204 or 205 and selecting or switching the frequency used, and performing carrier detection control upon transmitting data, reception level detection control upon receiving data, frame synchronization, and bit synchronization control, as radio control.

Figure 3:
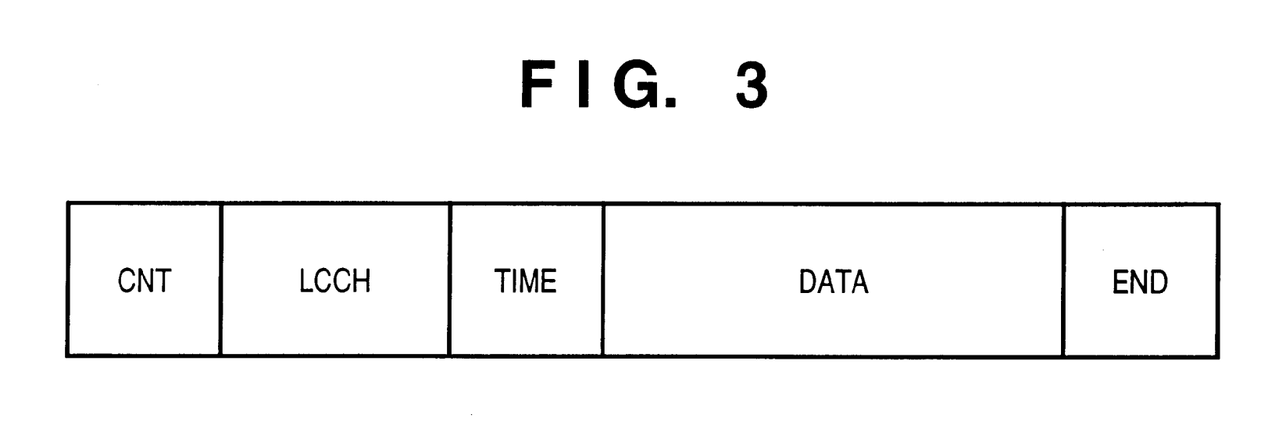
FIG. 3 is an explanatory view showing a radio frame used in the radio data communication system shown in FIG. 1.

Each of the radio control circuits 203 and 206 wraps data transmitted from the external interface 201 or 208 in a radio frame shown in FIG. 3, or strips off the radio frame wrapping received by the radio circuit 204 or 205 and transmits the extracted data to the external interface 201 or 208. Also, each radio control circuit performs simple error detection and scrambling such as CRC.

Each of the radio circuits 204 and 205 modulates information converted into a radio frame by the radio control circuit 203 or 206 so as to convert the information into a format capable of radio transmission, and sends the information to an antenna. Also, each radio circuit demodulates information received by radio via the antenna to obtain digital information. Each of the radio circuits 204 and 205 comprises a transmission/reception antenna, antenna selection switch, bandpass filter, reception amplifier, transmission amplifier, down and up converters for IF conversion, detecting device, voltage controlled oscillator (VCO), and the like.

FIG. 3 is an explanatory view showing a radio frame used in the radio communication system of this embodiment.

Referring to FIG. 3, reference symbol CNT denotes a system control channel; LCCH, a logic control channel; TIME, a time interval information channel; DATA, a data channel which stores data to be transmitted to/received from the information apparatus 101 or 104; and END, a guard channel for preventing interference with the next radio frame. The CNT channel is located at the start position of the radio frame, contains a carrier sense time, a preamble for bit synchronization, a frame sync signal for frame synchronization, and a call code, and physically controls the wireless section between the master station and subsidiary station.

The LCCH channel stores a command for controlling a radio channel such as a radio channel connection or disconnection command.

Figure 4:
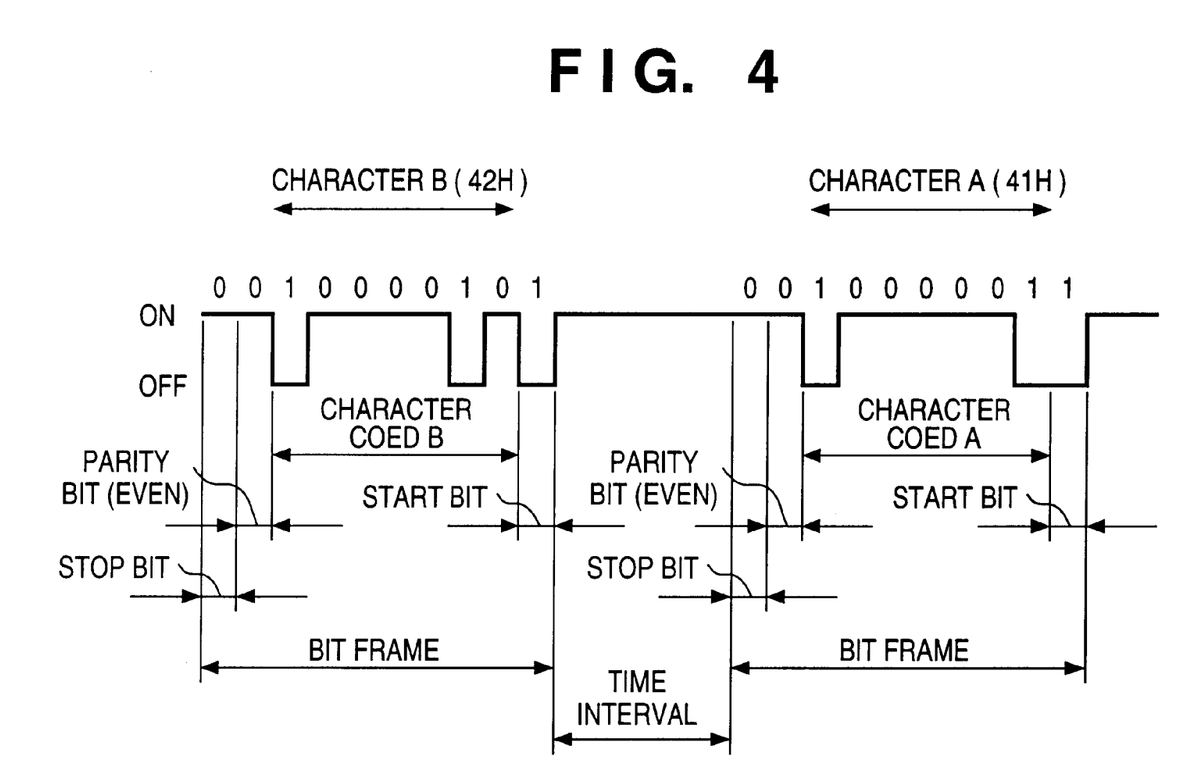
FIG. 4 is an explanatory view showing an example of a signal of start-stop transmission.

FIG. 4 is an explanatory view of an example of signals of start-stop transmission as a representative bit synchronization scheme for synchronizing in units of bits.

In this start-stop transmission, timing signals are independently generated on the transmitting and receiving sides. A reference signal is inserted at predetermined bit intervals, and the receiving side uses the start phase of this signal as a timing signal to be generated by the own station.

Start-stop transmission will be explained using FIG. 4. A start bit, and a parity bit and stop bit, are respectively appended to the head and tail of each character code (e.g., in units of 8 or 7 bits like character A [41H]), and stop bits continue in a non-communication state. Hence, upon receiving the start bit, the receiving side generates a timing signal from that timing, and can extract data synchronously.

Figure 5:
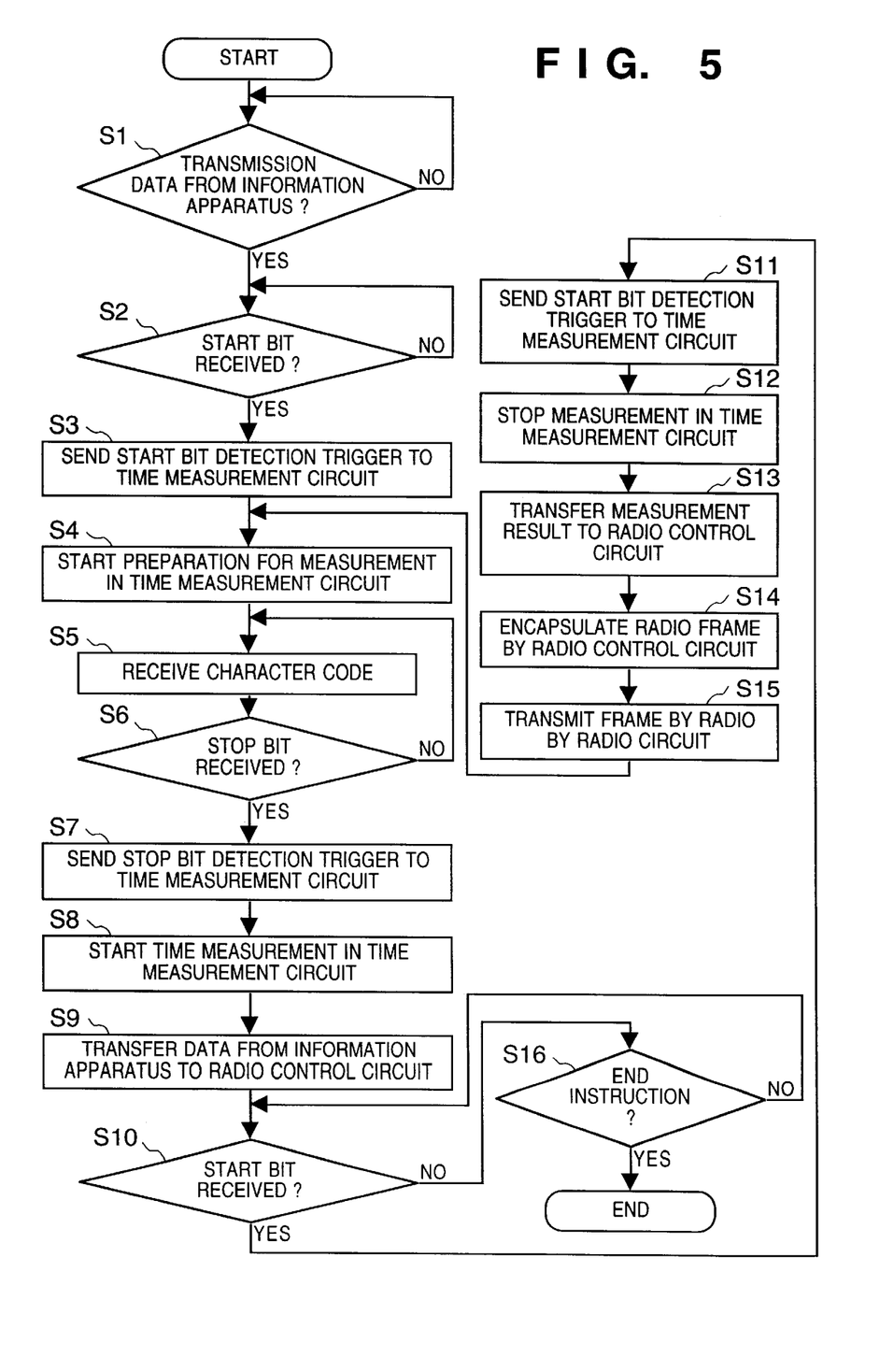
FIG. 5 is a flow chart showing the operation of the transmitting radio apparatus in the radio data communication system according to the embodiment of the present invention.
Figure 6:
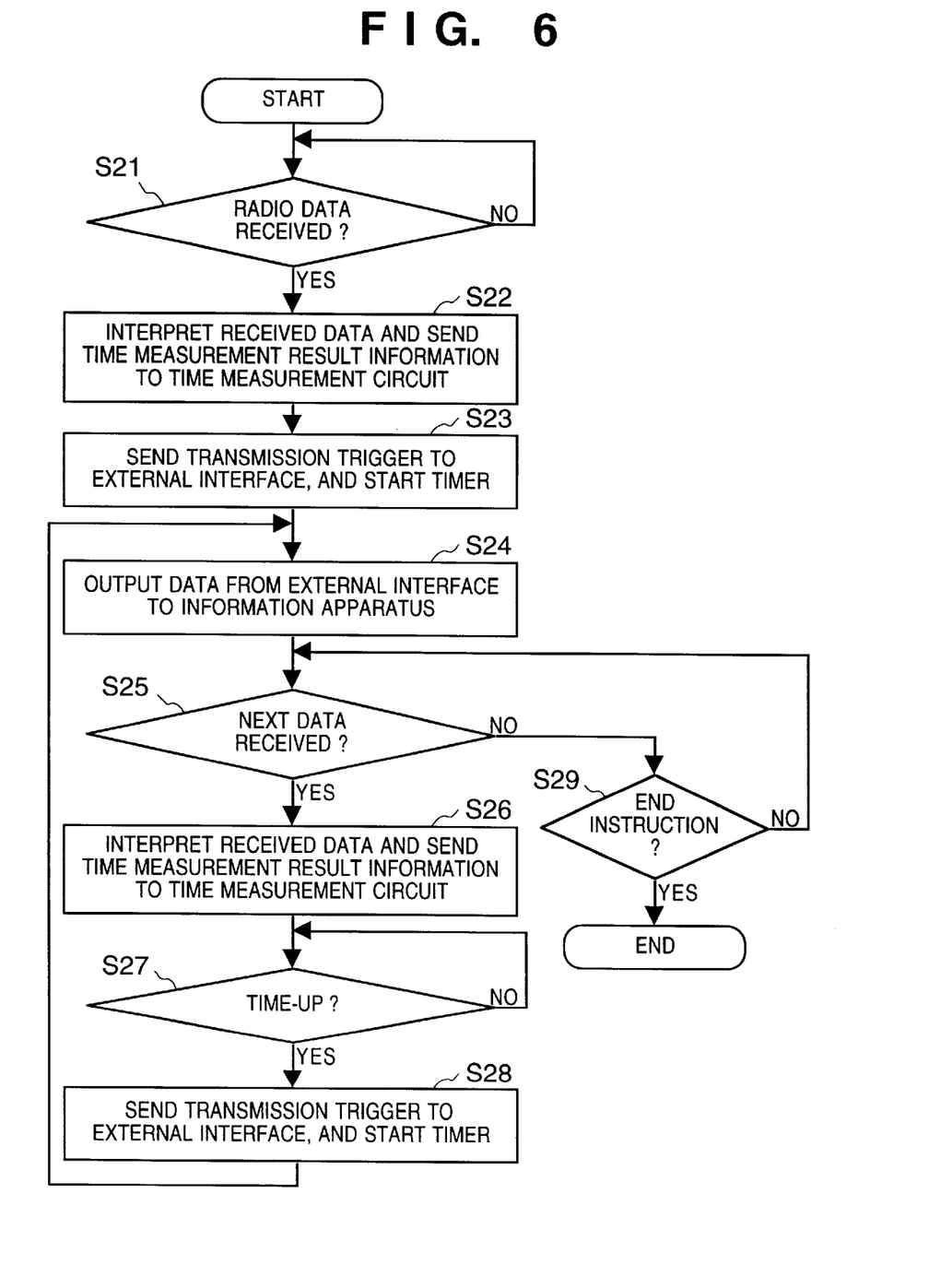
FIG. 6 is a flow chart showing the operation of the receiving radio apparatus in the radio data communication system according to the embodiment of the present invention.

FIGS. 5 and 6 are flow charts showing the operations of the radio apparatuses 102 and 103 in this embodiment. Operations from when data are transmitted from the information apparatus 101 via the radio apparatus 102 until data reach the information apparatus 104 via the radio apparatus 103 will be explained below with reference to the flow charts.

Upon transmitting/receiving data using start-stop transmission in communications between the information apparatus 101 and radio apparatus 102, if data in the start-stop transmission format transferred from the information apparatus 101 is detected by the external interface 201 (S1), and if the external interface 201 detects a start bit (S2), the external interface 201 sends a start bit detection trigger to the time measurement circuit 202 (S3). The time measurement circuit 202 prepares for time measurement (e.g., resets a timer) since data reception has begun (S4).

Subsequently, data A is received (S5), and if a stop bit is finally received (S6), a stop bit detection trigger is sent to the time measurement circuit 202 (S7). Upon reception of the stop bit detection trigger, the time measurement circuit 202 starts time measurement (S8). The external interface 201 sends received data to the radio control circuit 203 (S9).

If the external interface 201 detects a start bit of next data B [42H] (S10), it sends a start bit detection trigger to the time measurement circuit 202 again (S11). Upon reception of the start bit detection trigger, the time measurement circuit 202 stops measurement of the time interval (S12), and sends a time interval measurement result to the radio control circuit 203 (S13).

The radio control circuit 203 writes data A received from the external interface 201 in the DATA channel of a radio frame, the time interval measurement result (a time interval from when the stop bit of data A is received until the start bit of data B is received) in the TIME channel, and sets control data in the CNT and LCCH channels. Then, the radio control circuit 203 sends that frame to the radio circuit 204 (S14), and the frame is transmitted to the partner radio apparatus 103 as radio data.

Likewise, upon transmitting data B to the radio apparatus 103, the time interval from when the stop bit of data B is received until the start bit of data C is received is written in the TIME channel.

After reception of the stop bit of given data, if an end instruction from the information apparatus is detected in place of the start bit of the next data, no time information is set in the TIME channel, and control data indicating the end of data transfer is written in the control channel, then transmitting data to the radio apparatus 103.

In this way, upon transmitting data, the time information indicating the interval between the current data and next data is written in the TIME channel of a radio frame that carries the current data.

In the data receiving side (radio apparatus 103), upon receiving radio data by the radio circuit 205 (S21), the radio control circuit 206 interprets the contents of the CNT and LCCH channels. If control data is normal, the radio control circuit 206 sends data set in the DATA channel to the external interface 208, and the time interval measurement result information set in the TIME channel to the time measurement circuit 207 (S22).

Upon receiving the time interval measurement result, the time measurement circuit 207 sends a transmission trigger of received data to the external interface 208, and starts a timer for measuring the time interval between data (S23).

Upon reception of the transmission trigger, the external interface 208 transmits the data to the information apparatus 104 (S24). If the next data is subsequently sent from the radio circuit 205 to the radio control circuit 206 (S25), the radio control circuit 206 sends data set in the DATA channel to the external interface 208 and the time interval measurement result information set in the TIME channel to the time measurement circuit 207 (S26).

The time measurement circuit 207 sends transmission triggers in turn to the external interface 208 when the time measurement timer has reached time-up (S27). The external interface 208 transmits the received data to the information apparatus 104 at the reception timing of the transmission trigger (S28).

In this manner, the received data is transferred to the information apparatus 104 at the timing of the transmitting side (i.e., the transfer timing of data from the information apparatus 101 to the radio apparatus 102). Upon receiving a transmission end instruction from the transmitting side (S16), reception ends (S29).

Figure 7:
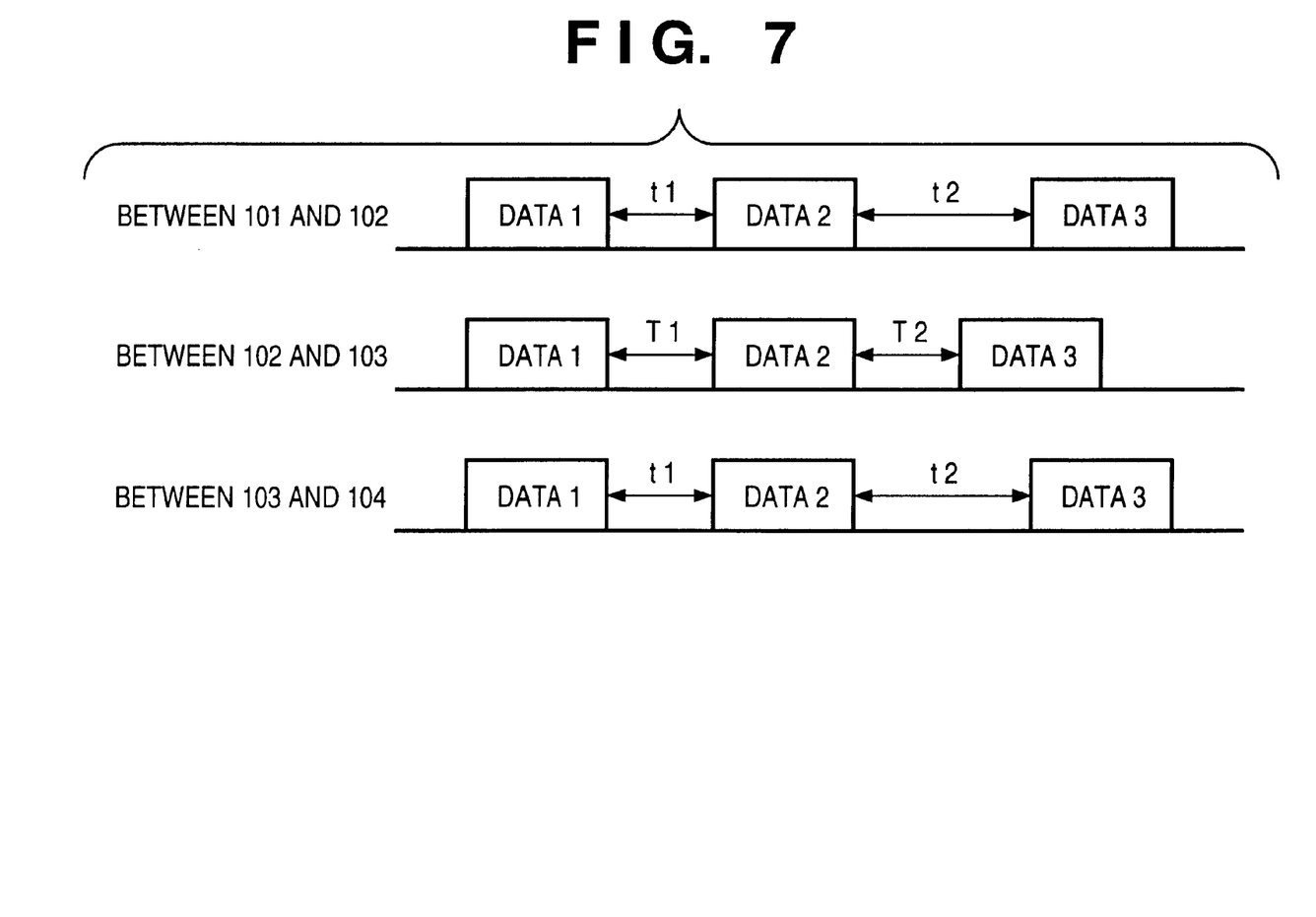
FIG. 7 is a timing chart showing the timings of transmission data in the radio data communication system according to the embodiment of the present invention.

FIG. 7 is an explanatory view showing how the intervals between adjacent data 1 to 3 transmitted from the information apparatus 101 change during their journey until they are received by the information apparatus 104.

Between the information apparatus 101 and radio apparatus 102, the interval between data 1 and 2 is represented by t1, and that between data 2 and 3 by t2. That is, t1 and t2 in this case indicate the data transmission intervals of the information apparatus 101.

When data 1 to 3 are input to the radio apparatus 102, they are encapsulated in radio frames. In this case, data are segmented or combined depending on the data length provided by the radio frame. Assume that one data is transmitted using one radio frame herein.

In the wireless section between the radio apparatuses 102 and 103, data 1 to 3 are transmitted so that the interval between data 1 and 2 changes to T1 and that between data 2 and 3 to T2 as a result of the data processing of the radio apparatus 102. The transmitted data are received by the radio apparatus 103. T1 and T2 are determined by the processing time required for a radio frame encapsulation process and radio frame transmission in the radio apparatus 102, but are roughly constant intervals. Data 1 to 3 received by the radio apparatus 103 are stripped off their radio frame wrappings, and are transmitted to the information apparatus 104. In this case, the transmission time intervals between adjacent data when they are transmitted from the information apparatus 101 are transmitted to the receiving radio apparatus 103, and the data are transmitted from the receiving radio apparatus 103 to the information apparatus 104 at the received time intervals. Hence, the transmission interval between adjacent data upon transmitting data to the information apparatus 104 is the same as that upon transmitting data by the information apparatus 101, i.e., the interval between data 1 and 2 is t1, and that between data 2 and 3 is t2.

In the above description, start-stop transmission is used between the information apparatus 101 and radio apparatus 102. Also, other synchronization schemes may be similarly used.

Figure 8:
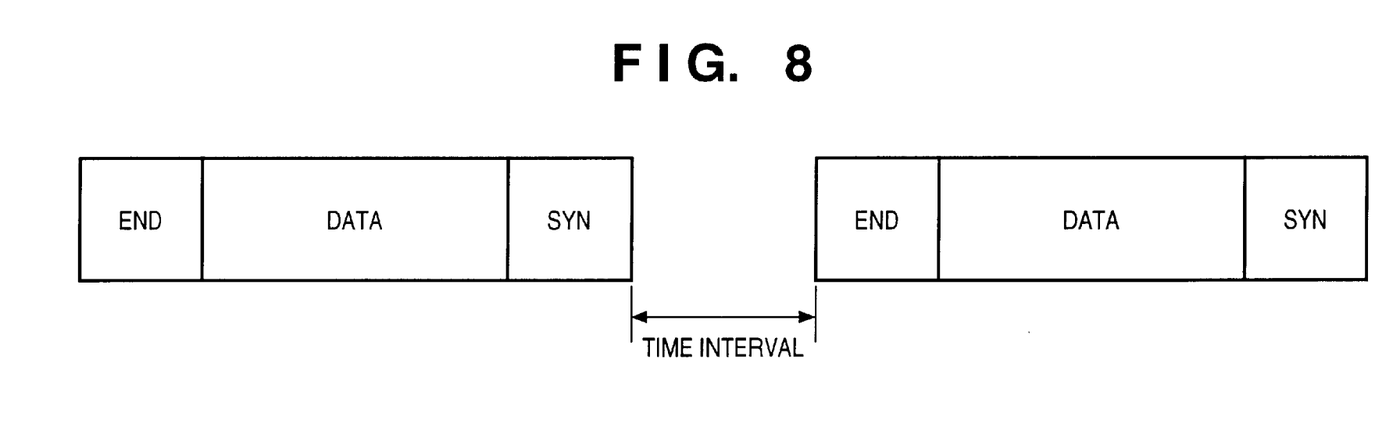
FIG. 8 is an explanatory view showing a radio frame used in a radio data communication system according to another embodiment of the present invention.

FIG. 8 shows an example using character synchronization as one of block synchronization schemes. A specific code (SYN code) is used to detect the data start position, and END code is used to detect the data end position.

In case of character synchronization as well, when the external interface 201 receives a SYN code, it informs the time measurement circuit 202 of that code as in the start bit detection trigger in start-stop transmission; when the external interface 201 detects an END code, it informs the circuit 202 of that code like in the stop bit detection trigger, thus synchronizing the data time interval between the receiving side and transmitting side.

As described above, even when the codes used to detect the data start and end positions are arbitrarily determined, the same function can be obtained. Hence, by determining appropriate codes, the time interval between specific data can also be adjusted.

The above description did not particularly concern itself about whether the transfer interval of data between the information apparatus and radio apparatus is larger or smaller than the interval of data exchanged by radio between the radio apparatuses.

However, depending on the data transfer rate in the wired section between the information apparatus and radio apparatus, the radio processing speed of the radio apparatus, and the data transfer rate in the wireless section in the system, the transfer interval of data between the information apparatus and radio apparatus may be larger or smaller than the data interval upon radio communications between the radio apparatuses (t1>T1 and t2>T2 or t1<T1 and t2<T2 in FIG. 7).

In such system, the transmitting side temporarily stores data transmitted from the information apparatus 101 in, e.g., a buffer of the radio apparatus 102, and transmits data to the radio apparatus 103 after data of a predetermined size have been stored, or after a predetermined period of time has elapsed from the beginning of data storage.

The receiving radio apparatus 103 temporarily stores received data in, e.g., its buffer, and starts the timer for measuring the transmission timing of data to the information apparatus 104 and transmits data to the information apparatus 104 after data of a predetermined size have been stored, or after a predetermined period of time has elapsed from the beginning of data storage.

Especially, in a system wherein the transfer interval of data between the information apparatus and radio apparatus is expected to be smaller than the data interval upon radio communications between the radio apparatuses, the receiving radio apparatus preferably temporarily stores data and then transmits the data to the information apparatus.

Note that a program that implements the aforementioned operations of the present invention may be stored in various computer-readable storage media such as a floppy disk, hard disk, CD-ROM, memory card, and the like, may be loaded by readers in the above-mentioned radio apparatuses 102 and 103, and may be executed by the radio apparatuses 102 and 103.

As described above, according to the present invention, information indicating the time interval of data transmitted from the information apparatus is encapsulated in a radio frame to be transmitted. The receiving radio apparatus that receives radio data transmits data to the information apparatus based on the received information indicating the time interval. In this way, variations of the data time interval can be suppressed, and even when data are transmitted using a wireless section, the data time intervals can be synchronized between the transmitting and receiving sides.

As many apparently widely different embodiments of the present invention can be made without departing from the spirit and scope thereof, it is to be understood that the invention is not limited to the specific embodiments thereof except as defined in the appended claims.

What is claimed is:

1. A radio communication apparatus connected to a first information processing apparatus to allow the first information processing apparatus to communicate with a second-information processing apparatus, comprising:

reception means for receiving at least first and second packets from the first information processing apparatus;

computing means for computing an interval between the first and second packets transmitted from the first information processing apparatus to the radio communication apparatus; and communication means for communicating the first packet to the second information processing apparatus together with information that pertains to the interval computed by said computing means, which is used by the second information processing apparatus to match a corresponding interval of the first and second packets at a receiving side with and interval of the first and second packets at a transmitting side.

2. The apparatus according to claim 1, wherein the interval computed by said computing means is a time interval between the first and second packets transmitted from the first information processing apparatus.

3. The apparatus according to claim 1, wherein said computing means computes the interval on the basis of an interval between the first and second packets received by said reception means.

4. The apparatus according to claim 1, wherein said communication means communicates the information using a communication frame upon communicating the first packet.

5. The apparatus according to claim 1, wherein the first information processing apparatus and said radio communication apparatus are connected via a wired connection, and said radio communication apparatus communicates the packet received via the wired connection with the second information processing apparatus by radio.

6. A radio communication apparatus connected to a first information processing apparatus to allow the first information processing apparatus to communicate with a second information processing apparatus, comprising:

reception means for receiving a packet transmitted from the second information processing apparatus;

identification means for identifying information, which is appended to the packet received by said reception means and pertains to an interval between packets computed by another radio communication device related to packets transmitted by the second information processing apparatus to said another radio communication apparatus; and transmission means for transmitting the packet transmitted from the second information processing apparatus to the first information processing apparatus at an interval that matches the interval identified by said identification means.

7. The apparatus according to claim 6, wherein the information indicates a time interval between a first packet and a second packet received after the first packet.

8. The apparatus according to claim 6, wherein the first information processing apparatus and said radio communication apparatus are connected via a wired connection, and said radio communication apparatus receives the packet by radio.

9. A radio communication apparatus capable of connecting an information processing apparatus via an external interface, comprising:

time computing means for computing a time interval between packets transmitted from the information processing apparatus to the radio communication apparatus;

frame generation means for encapsulating information that pertains to the time interval computed by said time computing means in a radio frame such that a communication partner can transmit the packets to an information processing apparatus connected to the communication partner at a time interval that matches the time interval computed by said time computing means; and communication means for making a radio communication with the communication partner using the radio frame generated by said frame generation means.

10. The apparatus according to claim 9, wherein said time computing means computes an interval between detection timings of a stop bit and start bit of start-stop transmission.

11. The apparatus according to claim 9, wherein said time computing means computes an interval between detection timings of an end sync signal and start sync signal of frame synchronization.

12. A radio communication apparatus capable of connecting an information processing apparatus via an external interface, comprising:

reception means for receiving a radio frame inserted with information which pertains to a time interval between packets computed by another radio communication device related to packets communicated between said another radio communication apparatus and another information processing apparatus;

interpretation means for interpreting the information inserted in the radio frame received by said reception means; and transmission means for transmitting the packets to the information processing apparatus via the external interface at a time interval that matches the time interval interpreted by said interpretation means.

13. A method of controlling a radio communication apparatus connected to a first information processing apparatus to allow the first information processing apparatus to communicate with a second information processing apparatus, comprising:

a reception step of receiving at least first and second packets from the first information processing apparatus;

a computing step of computing an interval between the first and second packets transmitted from the first information processing apparatus to the radio, communication apparatus; and a communication step of communicating, said first packet to the second information processing apparatus together with information that pertains to the interval identified in said computing step, which is used by the second information processing apparatus to match a corresponding interval of the first and second packets at a receiving side with an interval of the first and second packets at a transmitting side.

14. A method of controlling a radio communication apparatus connected to a first information processing apparatus to allow the first information processing apparatus to communicate with a second information processing apparatus, comprising:

a reception step of receiving a packet transmitted from the second information processing apparatus;

an identification step of identifying information, which is appended to the packet received in said reception step and pertains to an interval between packets computed by another radio communication apparatus related to packets transmitted by the second information processing apparatus to said another radio communication apparatus; and a transmission step of transmitting the packet transmitted from the second information processing apparatus to the first information processing apparatus at an interval that matches the interval identified in said identification step.

15. A method of controlling a radio communication apparatus capable of connecting an information processing apparatus via an external interface, comprising:

a time computing step of computing a time interval of between packets communicated between the radio communication apparatus and the information processing apparatus;

a frame generation step of encapsulating information that pertains to the time interval computed in said time computing step in a radio frame such that a communication partner can transmit the packets to an information processing apparatus connected to the communication partner at a time interval that matches the time interval computed in said time computing step; and a communication step of making a radio communication with the communication partner using the radio frame generated in the frame generation step.

16. A method of controlling a radio communication apparatus capable of connecting an information processing apparatus via an external interface comprising:

a reception step of receiving a radio frame inserted with information which pertains to a time interval between packets computed by another radio communication apparatus related to packets communicated between another information processing apparatus and said another radio communication apparatus;

an interpretation step of interpreting the information inserted in the radio frame received in said reception step; and a transmission step of transmitting the packets to the information processing apparatus via the external interface at a time interval that matches the time interval interpreted in said interpretation step.

* * * * *